(12) United States Patent
Asakura et al.

(10) Patent No.: US 11,342,605 B2
(45) Date of Patent: May 24, 2022

(54) POWER STORAGE DEVICE

(71) Applicant: Toyota Jidosha Kabushiki Kaisha, Toyota (JP)

(72) Inventors: Kazuma Asakura, Okazaki (JP); Masatoshi Hayashita, Miyoshi (JP); Yasuyuki Takei, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 16/249,323

(22) Filed: Jan. 16, 2019

(65) Prior Publication Data

US 2019/0221903 A1    Jul. 18, 2019

(30) Foreign Application Priority Data

Jan. 17, 2018    (JP) .............................. JP2018-005757

(51) Int. Cl.
| | |
|---|---|
| *H01M 10/615* | (2014.01) |
| *H01M 10/625* | (2014.01) |
| *H01M 50/20* | (2021.01) |

(52) U.S. Cl.
CPC ....... *H01M 10/615* (2015.04); *H01M 10/625* (2015.04); *H01M 50/20* (2021.01); *H01M 2220/20* (2013.01)

(58) Field of Classification Search
CPC ............. H01M 10/615; H01M 10/625; H01M 2/1077; H01M 2/1083
See application file for complete search history.

(56) References Cited

U.S. PATENT DOCUMENTS

| | | | | |
|---|---|---|---|---|
| 4,762,978 | A  * | 8/1988 | Tanis ................... | H01M 10/615 219/209 |
| 2007/0018610 | A1* | 1/2007 | Wegner ............... | H01M 10/653 320/112 |
| 2012/0009455 | A1* | 1/2012 | Yoon ................... | H01M 10/613 429/120 |
| 2013/0341319 | A1 | 12/2013 | Todoroki et al. | |
| 2016/0133997 | A1* | 5/2016 | Vejalla ................ | H01M 2/1077 429/120 |
| 2018/0034121 | A1* | 2/2018 | Kwon ................. | H01M 2/1094 |

FOREIGN PATENT DOCUMENTS

| | | |
|---|---|---|
| CN | 1757132 A | 4/2006 |
| CN | 105584345 A | 5/2016 |
| EP | 1601041 A1 | 11/2005 |
| JP | 2012-190689 A | 10/2012 |

\* cited by examiner

*Primary Examiner* — Jimmy Vo
(74) *Attorney, Agent, or Firm* — Dinsmore & Shohl LLP

(57) ABSTRACT

A power storage device includes a power storage module including a plurality of power storage cells aligned in one direction, a healer formed to be deformable along a shape of the power storage module and configured to heat the power storage module, and an elastic member configured to press the heater against the power storage module.

7 Claims, 7 Drawing Sheets

POWER STORAGE DEVICE

This nonprovisional application claims priority to Japanese Patent Application No. 2018-005757 filed on Jan. 17, 2018 with the Japan Patent Office, the entire contents of which are hereby incorporated by reference.

BACKGROUND

Field

The present disclosure relates to a power storage device.

Description of the Background Art

Conventionally, various proposals have been made for a power storage device provided with a heater in order to secure the performance of the power storage device also in a cold district and the like.

For example, a power storage device described in Japanese Patent Laying-Open No. 2012-190689 includes a power-storage module, a heater module, and an insulating holder.

The heater module is provided on an upper surface of the insulating holder. This heater module includes a plate-like heating element and a soaking plate. The plate-like heating element is provided on the upper surface of the insulating holder, and the soaking plate is provided on an upper surface of the plate-like heating element.

A heater body locking portion configured to fix the heater module is formed in the insulating holder. This heater body locking portion is formed to project toward the power storage module.

In addition, the heater body locking portion suppresses the heater module from coming into contact with a lower surface of the power storage module, and the heater module is arranged to be spaced from the lower surface of the power storage module.

SUMMARY

In the power storage device described above, the heater module is arranged to be spaced from the power storage module. Thus, it is not possible to successfully increase the temperature of the power storage module.

Here, it is conceivable to bring the heater module into contact with the power storage module. However, for example in such a mounting state where both ends of the power storage module are placed on pedestals, the power storage module may bend and deform under its own weight.

Accordingly, even though an attempt is made to simply bring the heater module into contact with the power storage module, a gap is likely to be formed between the heater module and the power storage module. As a result, heat from the heater module is less likely to be transferred to the power storage module, and thus it may not be possible to successfully increase the temperature of the power storage module.

The present disclosure has been made in view of the aforementioned problem, and an object thereof is to provide a power storage device capable of successfully increasing the temperature of a power storage module.

A power storage device in accordance with the present disclosure includes a power storage module including a plurality of power storage cells aligned in one direction, a heater formed to be deformable along a shape of the power storage module and configured to heat the power storage module, and an elastic member configured to press the heater against the power storage module.

In the power storage, device described above, since the elastic member presses the heater against the power storage module, the heater deforms according to the shape of the power storage module. Further, since the elastic member also deforms according to the shape of the power storage module, the elastic member can successfully press the heater against the power storage module. As a result, formation of a large gap between the heater and the power storage module can be suppressed, and the temperature of the power storage module can be successfully increased.

The power storage device described above further includes a placement stand on which the heater is placed. The elastic member is configured to press the placement stand against the power storage module, and a contact area between the elastic member and the placement stand is smaller than a contact area between the placement stand and the heater.

The power storage device described above can suppress heat of the heater from being transferred to the elastic member through the placement stand, and can suppress the heat from the heater from being dissipated to the outside through the elastic member.

The power storage device described above further includes a placement stand on which the heater is placed, and an accommodation case configured to accommodate the power storage module, the elastic member, and the heater. The elastic member is configured to press the placement stand against the power storage module, the elastic member is arranged between the accommodation case and the placement stand. A contact area between the elastic member and the accommodation case is smaller than a contact area between the placement stand and the heater.

The power storage device described above can suppress heat from the heater transferred to the elastic member from being dissipated into the accommodation case.

The placement stand described above includes a plurality of divided stands aligned in the one direction. In the power storage device described above, the position of each divided stand is displaced and the elastic member deforms according to the shape of the power storage module. Thereby, the heater can be successfully pressed against the power storage module.

The elastic member and the heater described above extend in the one direction. In the power storage device described above, the heater is successfully pressed against the plurality of power storage cells.

The power storage module described above includes a first end portion and a second end portion located at end portions in the one direction. The power storage module is supported at the first end portion and the second end portion. The elastic member includes a first elastic portion and a second elastic portion, and the first elastic portion is provided at a position closer to a central portion of the power storage module in the one direction than the second elastic portion. An elastic coefficient of the first elastic portion is higher than an elastic coefficient of the second elastic portion.

In the power storage device described above, since the power storage module is supported at both ends, the central portion of the power storage module tends to vibrate greatly when the power storage module vibrates.

On the other hand, since the first elastic portion located at the central portion of the power storage module has a high elastic coefficient, the central portion of the power storage module can be suppressed from vibrating greatly. Since the central portion of the power storage module can be suppressed from vibrating greatly in this manner, the heater can be successfully brought into contact with the power storage module.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a perspective view showing a heater, a placement stand, and the like.

FIG. 9 is a cross sectional view showing the heater, the placement stand, and the like.

DETAILED DESCRIPTION

Figure 1:
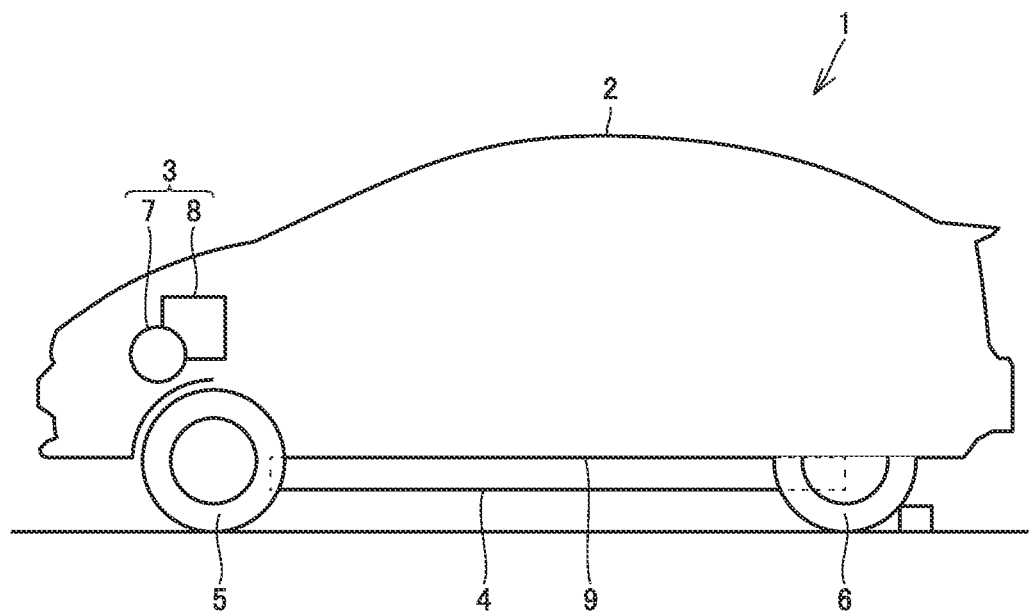
FIG. 1 is a side view schematically showing a vehicle.

A power storage device in accordance with the present embodiment will be described using FIGS. 1 to 11. Of the components shown in FIGS. 1 to 11, identical or substantially identical components will be designated by the same reference numerals, and an overlapped description will be omitted.

First Embodiment

FIG. 1 is a side view schematically showing a vehicle 1. Vehicle 1 includes a vehicle body 2, a drive device 3, a power storage device 4, front wheels 5, and rear wheels 6.

In vehicle body 2, an engine compartment, a riding space, and a luggage compartment are formed. The engine compartment is formed on the front side of vehicle 1, and the riding space is formed behind the engine compartment. The luggage compartment is formed behind the riding space.

Drive device 3 is accommodated within the engine compartment. Drive device 3 includes a rotating electrical machine 7 and a PCU (Power Control Unit) 8. PCU 8 includes an inverter and a converter. PCU 8 is electrically connected to power storage device 4 and rotating electrical machine 7.

PCU 8 boosts a voltage of direct current (DC) power supplied from power storage device 4, and further converts the DC power into alternating current (AC) power and supplies it to rotating electrical machine 7.

Rotating electrical machine 7 generates a drive force for rotating front wheels 5 using the AC power supplied from PCU 8. It should be noted that vehicle 1 is an electrically powered vehicle, such as an electric vehicle or a hybrid vehicle.

Vehicle body 2 includes a floor panel 9. Floor panel 9 is a plate-like metal member forming a bottom surface of vehicle 1. Power storage device 4 is arranged on a lower surface of floor panel 9.

Figure 2:
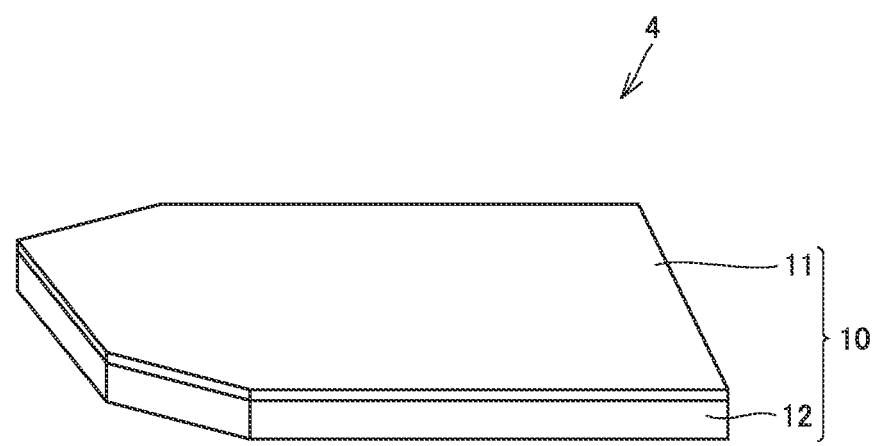
FIG. 2 is a perspective view schematically showing a power storage device in accordance with a first embodiment.

FIG. 2 is a perspective view schematically showing power storage device 4. Power storage device 4 includes a case 10. Case 10 includes a case body 12 and a lid 11.

Case body 12 is made of aluminum, an aluminum alloy, or the like. An opening opened upward is formed in case body 12.

Lid 11 is made of resin or the like to achieve a reduction in the weight of case 10. Lid 11 is provided to close the opening in case body 12.

Figure 3:
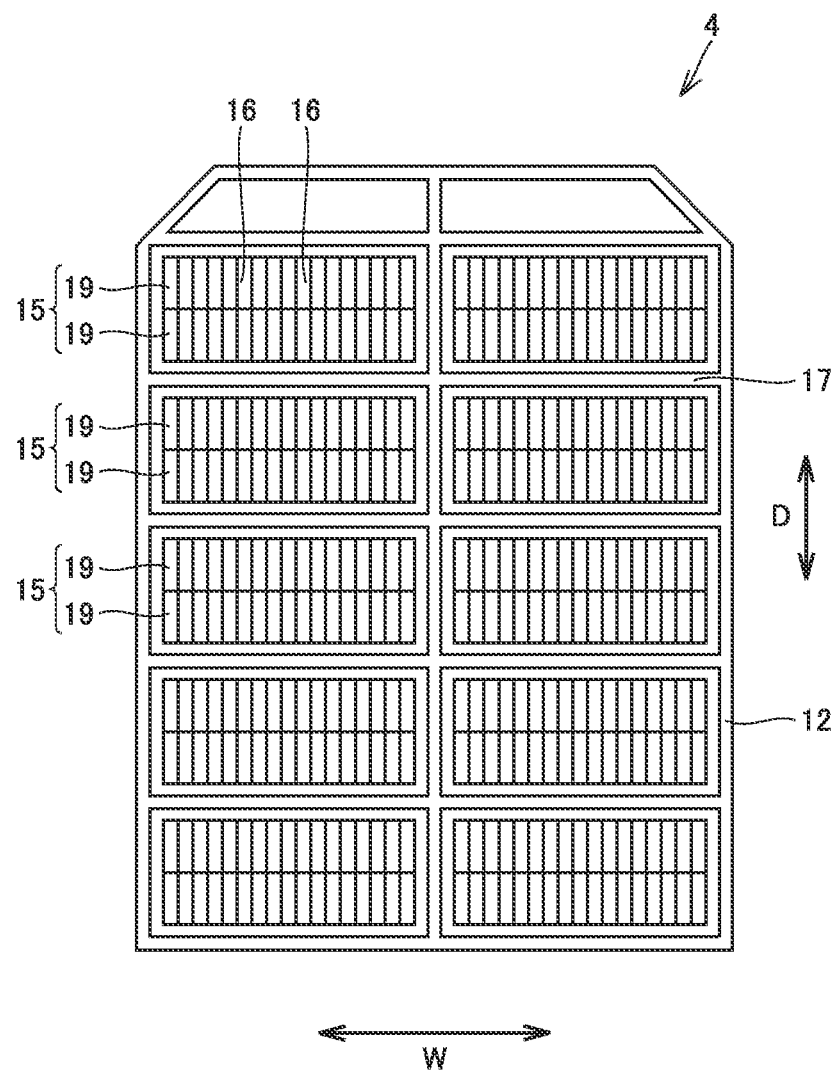
FIG. 3 is a pain view schematically showing the power storage device with a lid being removed.

FIG. 3 is a plan view schematically showing power storage device 4 with lid 11 being removed. Power storage device 4 includes a plurality of power storage modules 15. In the example shown in FIG. 3, two power storage modules 15 are aligned in a width direction W of vehicle 1, and five power storage modules 15 are aligned in a front-back direction D of vehicle 1. Each power storage module 15 includes a plurality of power storage cells 16 aligned in width direction W of vehicle 1.

It should be noted that, in the example shown in FIG. 3, each power storage module 15 includes two cell columns 19 aligned in front-back direction D, and each cell column 19 includes a plurality of power storage cells 16 aligned in width direction W.

A reinforcing member 17 formed in the shape of a grid is provided in an inner surface of case body 12. Reinforcing member 17 is formed by connecting a plurality of reinforcements in the shape of a grid.

In addition, partitioned spaces in which power storage modules 15 are arranged are partitioned by reinforcing member 17, and power storage module 15 is arranged in each partitioned space.

Figure 4:
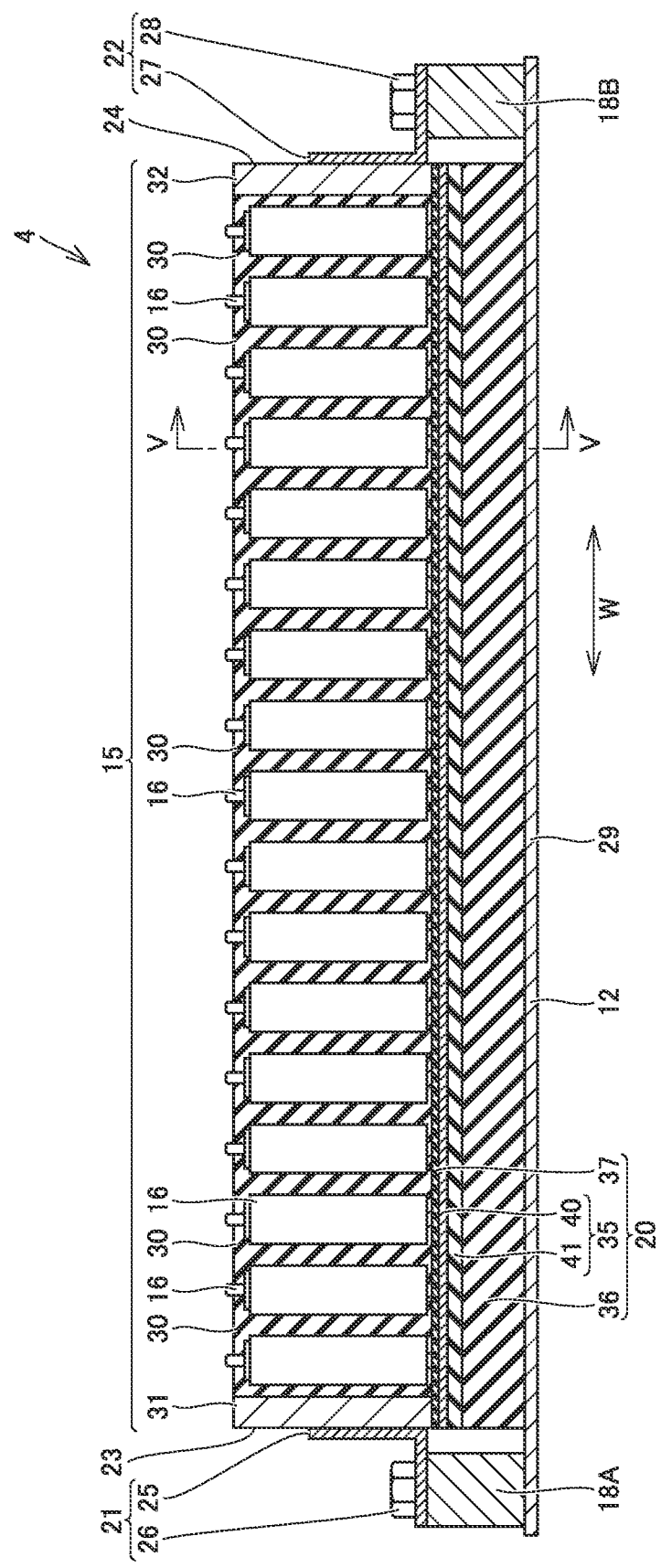
FIG. 4 is a cross sectional view showing a configuration of the power storage module and surroundings thereof.

FIG. 4 is a cross sectional view showing a configuration of power storage module 15 and surroundings thereof. Power storage device 4 includes a temperature increasing unit 20 and fixing members 21, 22. Power storage module 15 includes an end portion 23 and an end portion 24 located at both ends in width direction W.

Fixing member 21 fixes end portion 23 of power storage module 15 to a pedestal 18A. Fixing member 22 fixes end portion 24 of power storage module 15 to a pedestal 18B. Fixing member 21 includes a bracket 25 and a bolt 26, and fixing member 21 fixes end portion 23 of power storage module 15 on an upper surface of pedestal 18A. Similarly, fixing member 22 includes a bracket 27 and a bolt 28, and fixing member 22 fixes end portion 24 of power storage module 15 on an upper surface of pedestal 18B. Since pedestals 18A, 18B protrude upward from a bottom plate of case body 12, a lower surface of power storage module 15 is located above bottom plate 29 of case body 12. This configuration can suppress a high impact force from being applied to power storage module 15 even when, for example, a falling object on the ground collides with bottom plate 29 while vehicle 1 is traveling.

Power storage module 15 includes the plurality of power storage cells 16, a plurality of resin plates 30, and end plates 31, 32.

End plate 31 is arranged at end portion 23 of power storage module 15, and end plate 32 is arranged at end portion 24 of power storage module 15. In addition, end plate 31 is fixed on the upper surface of pedestal 18A by fixing member 21, and end plate 32 is fixed on the upper surface of pedestal 18B by fixing member 22. In this manner, power storage module 15 is fixed with being supported at the both ends.

End plate 31 and end plate 32 are coupled with each other using a restraint band or the like not shown. In addition, the plurality of power storage cells 16 and the plurality of resin plates 30 are restrained in a state where they are aligned in width direction W, using end plate 31 and end plate 32.

Power storage cells 16 are arranged to spaced from each other, and each resin plate 30 is arranged between power storage cells 16. It should be noted that, in the example shown in FIG. 4, resin plate 30 is also arranged between power storage cell 16 and end plate 31, and between power storage cell 16 and end plate 32.

Temperature increasing unit 20 is arranged between the lower surface of power storage module 15 and bottom plate 29 of case body 12. Temperature increasing unit 20 includes a heater 35, an elastic member 36, and an insulating plate 37.

Elastic member 36 is made of a material which is elastically deformable and has water corrosion resistance and insulation property. Elastic member 36 is made of a porous material formed using a melamine resin, a urethane resin, or the like, for example. Specifically, elastic member 36 is a sponge formed using the above resin or the like.

Elastic member 36 is arranged on bottom plate 29 of case body 12 to press heater 35 against power storage module 15.

Temperature increasing unit 20 is formed to extend in width direction W which is the direction in which the plurality of power storage cells 16 are aligned (corresponding to "one direction"). Specifically, temperature increasing unit 20 is formed to extend from end portion 23 to end portion 24 of power storage module 15.

Figure 5:
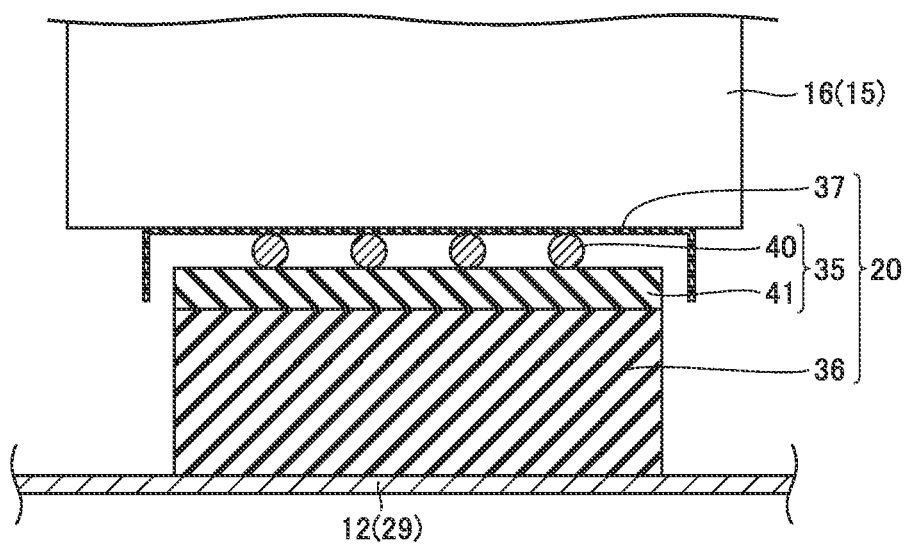
FIG. 5 is a cross sectional view taken along a line V-V in FIG. 4.

FIG. 5 is a cross sectional view taken along a line V-V in FIG. 4. Heater 35 includes a nonwoven fabric 41 and a heater wire 40. Nonwoven fabric 41 is provided on an upper surface of elastic member 36, and heater wire 40 is sewed on an upper surface of nonwoven fabric 41. Heater wire 40 includes a plurality of element wires and an insulating film which covers surfaces of the plurality of element wires.

The diameter of a cross section of heater wire 40 is about 1 mm, for example, and heater wire 40 is formed to be deformable according to the shape of a bottom surface of power storage module 15. Nonwoven fabric 41 is also formed to be deformable according to the shape of the bottom surface of power storage module 15.

Insulating plate 37 is arranged between the bottom surface of power storage module 15 and heater 35. Insulating plate 37 is provided to secure the insulation property between heater wire 40 and power storage cells 16. Insulating plate 37 is formed to be deformable according to the shape of the bottom surface of power storage module 15. It should be noted that insulating plate 37 has a thickness of about several millimeters, and insulating plate 37 is made of a resin material. Thus, insulating plate 37 is formed to be elastically deformable to some extent.

In temperature increasing unit 20 configured as described above, elastic member 36 presses heater 35 against power storage module 15. Heater 35 is pressed against the bottom surface of power storage module 15 with insulating plate 37 sandwiched therebetween.

In addition, the temperature of heater wire 40 increases as a current flows through heater wire 40. Heat from heater wire 40 is transferred to the bottom surface of power storage module 15 through insulating plate 37, and thereby power storage module 15 is heated.

Figure 6:
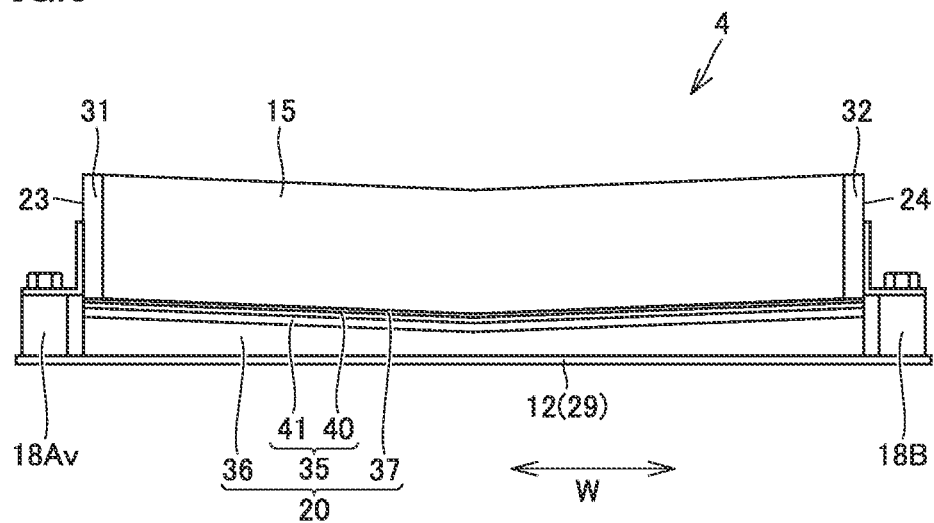
FIG. 6 is a cross sectional view schematically showing a state where the power storage module deforms to bend under its own weight.

FIG. 6 is a cross sectional view schematically showing a state where power storage module 15 deforms to bend under its own weight.

Since power storage module 15 is supported at both end portions 23, 24 and power storage module 15 is arranged to be spaced from bottom plate 29 of case body 12, power storage module 15 is likely to deform such that a central portion of power storage module 15 in width direction W bends downward.

Elastic member 36 deforms according to the shape of the bottom surface of power storage module 15. In addition, elastic member 36 presses heater 35 and insulating plate 37 against the bottom surface of power storage module 15.

Thereby, insulating plate 37 curves along the bending bottom surface of power storage module 15, and heater 35 also deforms along the shape of deforming insulating plate 37. This suppresses formation of a large gap between heater 35 and power storage module 15.

Therefore, even if power storage module 15 deforms to curve, the heat of heater wire 40 can be successfully transferred to power storage module 15. In addition, since heater 35 and elastic member 36 are formed to extend in the direction in which power storage cells 16 are aligned, the temperature of the plurality of power storage cells 16 can be successfully increased.

Second Embodiment

Figure 7:
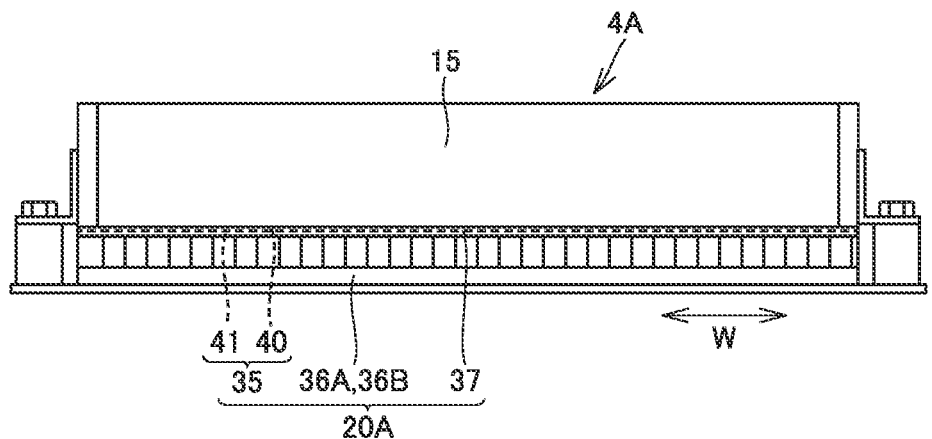
FIG. 7 is a side view schematically showing a power storage device in accordance with a second embodiment.

A power storage device 4A in accordance with a second embodiment will be described using FIG. 7 and the like. FIG. 7 is a side view schematically showing power storage device 4A. Power storage device 4A includes power storage module 15 and a temperature increasing unit 20A. Power storage module 15 is configured as in the first embodiment described above.

Temperature increasing unit 20A includes elastic members 36A, 36B, a placement stand 42, heater 35 and insulating plate 37. Heater 35 and placement stand 42 are formed to be elongated in a direction in which power storage module 15 extends.

Figure 8:
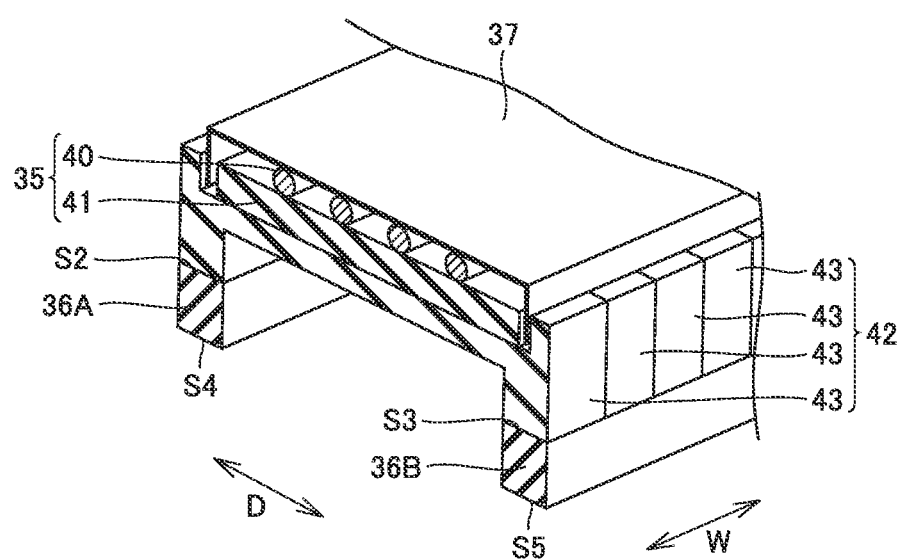
Figure 9:
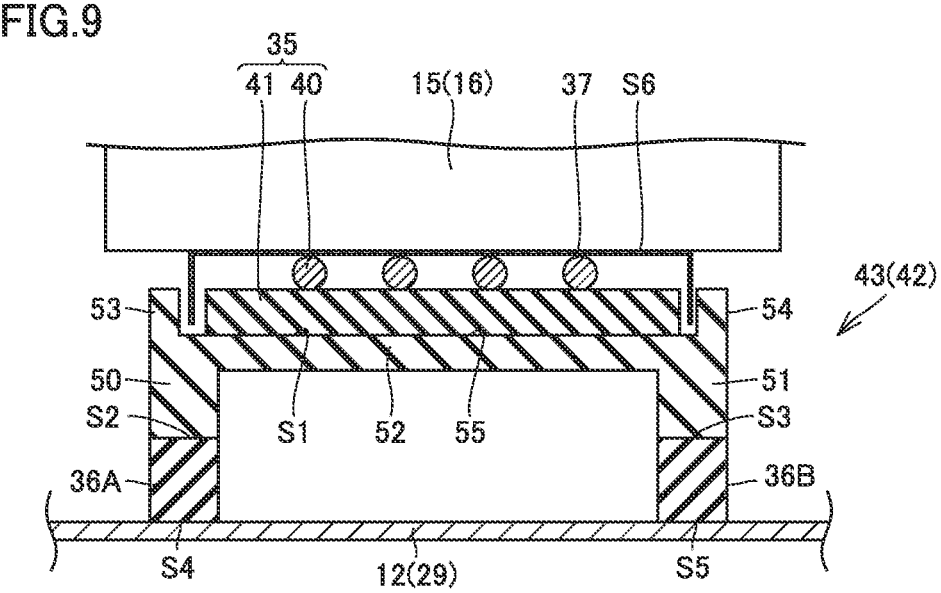

FIG. 8 is a perspective view showing heater 35, placement stand 42, and the like, and FIG. 9 is a cross sectional view showing heater 35, placement stand 42, and the like.

Elastic member 36A and elastic member 36B are arranged to be spaced from each other in front-back direction D of vehicle 1. Elastic members 36A, 36B are formed to be elongated in width direction W. Placement stand 42 is arranged on upper surfaces of elastic member 36A and elastic member 36B, and placement stand 42 is formed to straddle elastic member 36A and elastic member 36B. Heater 35 is arranged on an upper surface of placement stand 42.

In FIGS. 8 and 9, a contact area S1 indicates a contact area between heater 35 and placement stand 42. A contact area S2 indicates a contact area between elastic member 36A and placement stand 42. A contact area S3 indicates a contact area between elastic member 36B and placement stand 42.

A contact area S4 indicates a contact area between elastic member 36A and bottom plate 29 of case body 12, and a contact area S5 indicates a contact area between elastic member 36B and bottom plate 29. A contact area S6 indicates a contact area between insulating plate 37 and power storage module 15.

In addition, a total area of contact area S2 and contact area S3 is smaller than contact area S1. That is, the contact area, between elastic members 36A, 36B and placement stand 42 is smaller than the contact area between heater 35 and placement stand 42.

A total area of contact area S4 and contact area S5 is smaller than contact area S1. That is, an installation area of elastic members 36A, 36B is smaller than the contact area between heater 35 and placement stand 42.

Further, contact area S6 is larger than any of the total area of contact area S2 and contact area S3 and the total area of contact area S4 and contact area S5. Furthermore, contact area S6 is larger than contact area S1.

Divided stands 43 each include leg, portions 50, 51, a top plate portion 52, and wall portions 53, 54. Leg portions 50, 51 are arranged on elastic members 36A, 36B. Top plate portion 52 is formed to connect leg portion 50 and leg portion 51. Wall portions 53, 54 are formed to protrude upward from an upper surface of top plate portion 52. In addition, in each divided stand 43, a concave portion 55 is formed of top plate portion 52, wall portion 53, and wall portion 54.

Heater 35 is arranged within concave portion 55. Specifically, nonwoven fabric 41 is provided on the upper surface of top plate portion 52, and heater wire 40 is provided on the upper surface of nonwoven fabric 41. Insulating plate 37 is provided to cover heater wire 40 and nonwoven fabric 41 from above.

Figure 10:
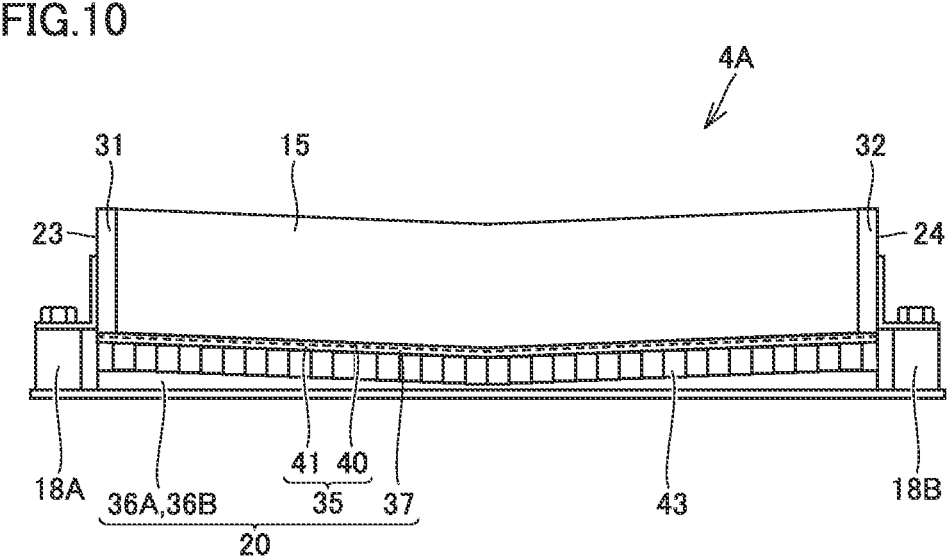
FIG. 10 is a side view schematically showing a state where a power storage module bends under its own weight.

FIG. 10 is a side view schematically showing a state where power storage module 15 bends under its own weight. Power storage module 15 is supported at both ends, and power storage module 15 deforms such that the central portion of power storage module 15 bends downward.

Since placement stand 42 is formed of a plurality of divided stands 43, the position of each divided stand 43 is displaced according to the shape of the lower surface of power storage module 15. Elastic members 36A, 36B deform according to the displacement of each divided stand 43.

Since placement stand 42 is formed of the plurality of divided stands 43 in this manner, placement stand 42 easily follows the shape of power storage module 15, and heater 35 placed on placement stand 42 also deforms to follow the shape of power storage module 15.

As a result, heat from heater 35 is easily transferred to power storage module 15, and the temperature of power storage module 15 can be successfully increased.

In FIG. 9, the heat from heater 35 is not only transferred to power storage module 15, but also dissipated into case body 12 through placement stand 42 and elastic members 36A, 36B. On this occasion, since the total area of contact area S2 and contact area S3 is smaller than contact area S1, heat transferred from heater 35 to placement stand 42 can be suppressed from being transferred to elastic members 36A, 36B.

Furthermore, the total area of contact area S4 and contact area S5 is smaller than contact area S1. Thus, heat transferred to elastic members 36A, 36B can be suppressed from being transferred to case body 12. In this manner, the heat of heater 35 can be suppressed from being dissipated into case body 12.

On the other hand, contact area S6 is larger than contact area S1. Thus, the heat from heater 35 is transferred to power storage module 15 easier than to placement stand 42.

In particular, insulating plate 37 has a thin thickness, and further, a metal case of each power storage cell 16 is made of an aluminum alloy or the like. Thus, the heat from heater 35 is easily transferred to power storage module 15.

Third Embodiment

Figure 11:
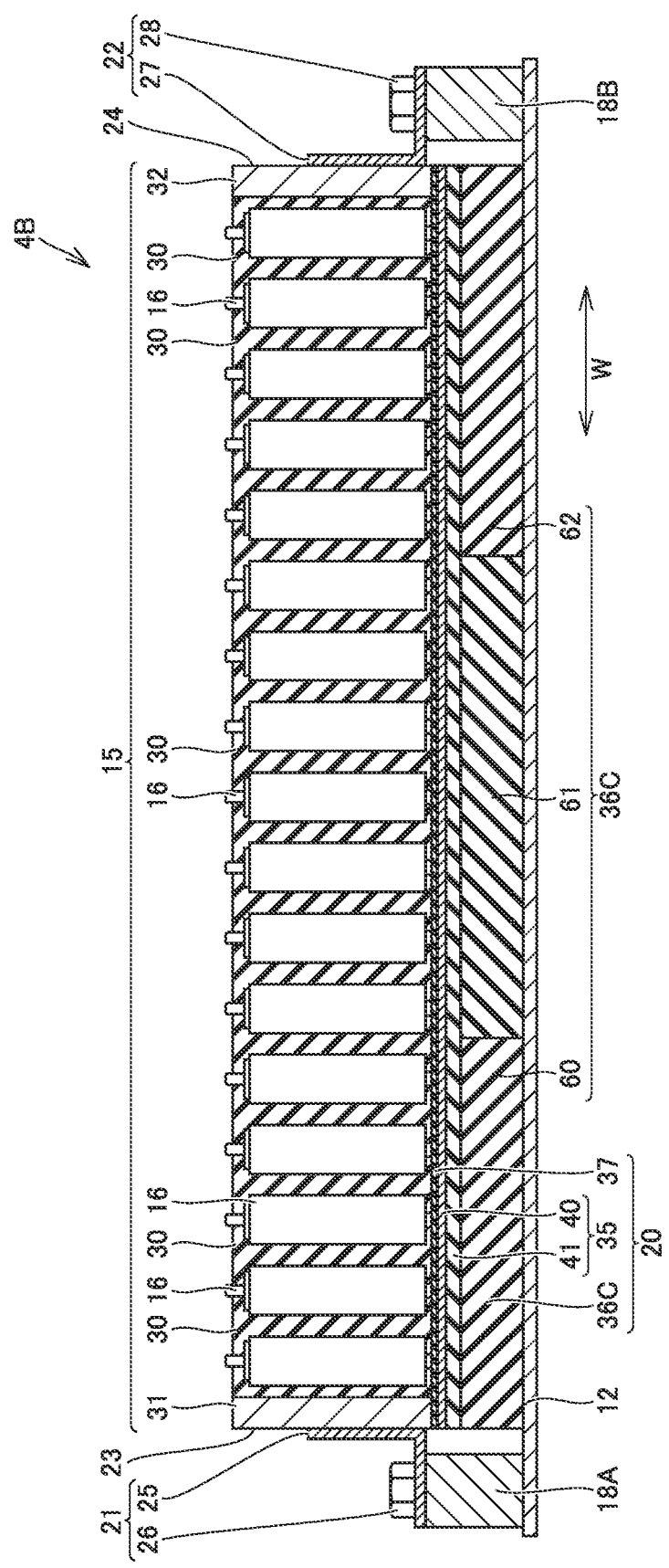
FIG. 11 is a side cross sectional view schematically showing a power storage device in accordance with a third embodiment.

A power storage device 4B in accordance with a third embodiment will be described using FIG. 11. It should be noted that FIG. 11 is a side cross sectional view schematically showing power storage device 4B. The configuration of power storage device 4B in accordance with the third embodiment is different from the configuration of power storage device 4 in accordance with the first embodiment in terms of the elastic member, and the components other than the elastic member of power storage device 4B are identical or substantially identical to the components of power storage device 4. Accordingly, the configuration of an elastic member 36C of power storage device 4B will be mainly described.

Elastic member 36C includes a plurality of elastic portions 60, 61, and 62. Elastic portion 61 is provided at a position closer to the central portion of power storage module 15 in width direction W than elastic portion 60 and elastic portion 62. In the example shown in FIG. 11, elastic portion 61 is arranged below the central portion of power storage module 15 in width direction W.

Elastic portion 60 is provided at a position closer to end portion 23 than elastic portion 61. Elastic portion 62 is provided at a position closer to end portion 24 than elastic portion 61.

The elastic coefficient of elastic portion 61 is higher than the elastic coefficient of elastic portions 60, 62. That is, elastic portion 61 is formed to be less deformable than elastic portions 60, 62.

It should be noted that, also in power storage device 4B in accordance with the third embodiment, end portion 23 of power storage module 15 is fixed to pedestal 18A, and end portion 24 thereof is fixed to pedestal 18B. In addition, power storage module 15 is arranged to be spaced from bottom plate 29 of case body 12.

In power storage device 4B configured as described above, vibration generated in vehicle 1 may be transferred to power storage device 4B while vehicle 1 is traveling. As a result, power storage module 15 may vibrate.

Since power storage module 15 is supported at both ends, power storage module 15 tends to vibrate such that the central portion of power storage module 15 serves as an antinode, for example.

On this occasion, elastic portion 61 is arranged below the central portion of power storage module 15. Since elastic portion 61 has a high elastic coefficient, elastic portion 61 can suppress a downward displacement of power storage module 15 to be small, and can suppress an amplitude of power storage module 15 to be small.

In this manner, power storage device 4B in accordance with the third embodiment can suppress power storage module 15 from vibrating greatly.

Although temperature increasing unit 20 is provided on the lower surface of power storage module 15 in the embodiments described above, temperature increasing unit 20 may be provided on a side surface or the like of power storage module 15. Each power storage cell 16 is likely to deform to swell due to aging degradation, and power storage module 15 may deform to bend laterally. Even when power storage module 15 deforms in such a manner, the heat from heater 35 can be successfully transferred to power storage module

15 by arranging the temperature increasing unit shown in the first to third embodiments on the side surface of power storage module 15.

Although the embodiments of the present disclosure have been described, it should be understood that the embodiments disclosed herein are illustrative and non-restrictive in every respect. The scope of the present disclosure is defined by the scope of the claims, and is intended to include any modifications within the scope and meaning equivalent to the scope of the claims.

What is claimed is:

1. A power storage device comprising:
   a power storage module including a plurality of power storage cells aligned in one direction and displaced on a heater;
   the heater configured to heat the power storage module;
   an elastic member configured to press the heater against the power storage module; and
   a placement stand on which the heater is placed,
   wherein the heater comprises one or more deformable wires that deform along with a shape of the power storage module,
   the elastic member directly presses the placement stand against the power storage module,
   the placement stand is positioned between the heater and the elastic member, and
   a contact area between the elastic member and the placement stand is smaller than a contact area between the placement stand and the heater.

2. The power storage device according to claim 1, further comprising:
   an accommodation case configured to accommodate the power storage module, the elastic member, and the heater, wherein
   the elastic member is arranged between the accommodation case and the placement stand, and
   a contact area between the elastic member and the accommodation case is smaller than a contact area between the placement stand and the heater.

3. The power storage device according to claim 1, wherein the placement stand includes a plurality of divided stands aligned in the one direction.

4. The power storage device according to claim 1, wherein the elastic member and the heater extend in the one direction.

5. The power storage device according to claim 1, wherein
   the power storage module includes a first end portion and a second end portion located at end portions in the one direction,
   the power storage module is supported at the first end portion and the second end portion,
   the elastic member includes a first elastic portion and a second elastic portion,
   the first elastic portion is provided at a position closer to a central portion of the power storage module in the one direction than the second elastic portion, and
   an elastic coefficient of the first elastic portion is higher than an elastic coefficient of the second elastic portion.

6. The power storage device according to claim 1, wherein the heater comprises one or more deformable fabric configured to deform according to the vertical deformation of the power storage module.

7. The power storage device according to claim 1, further comprising:
   a case including a bottom plate, wherein:
   the elastic member is positioned between the bottom plate and the heater; and
   a lower surface of the power storage module is located over the bottom plate.

* * * * *